US012691858B2

(12) United States Patent
Rupnik

(10) Patent No.: US 12,691,858 B2
(45) Date of Patent: Jul. 28, 2026

(54) BRAKE VALVE WITH DUAL PILOTING

(71) Applicant: POCLAIN HYDRAULICS INDUSTRIE, Verberie (FR)

(72) Inventor: Matja Rupnik, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 18/721,508

(22) PCT Filed: Dec. 13, 2022

(86) PCT No.: PCT/EP2022/085565
§ 371 (c)(1),
(2) Date: Jun. 18, 2024

(87) PCT Pub. No.: WO2023/126167
PCT Pub. Date: Jul. 6, 2023

(65) Prior Publication Data
US 2025/0058751 A1 Feb. 20, 2025

(30) Foreign Application Priority Data
Dec. 31, 2021 (FR) ...................................... 2114752

(51) Int. Cl.
*B60T 11/28* (2006.01)
*B60T 15/04* (2006.01)

(52) U.S. Cl.
CPC .................................... *B60T 11/28* (2013.01)

(58) Field of Classification Search
CPC ........... B60T 8/366; B60T 15/04; B60T 11/28
See application file for complete search history.

(56) References Cited

FOREIGN PATENT DOCUMENTS

| BE | 576773 A | 7/1959 |
| CN | 204110018 U | 1/2015 |
| JP | H0995234 A | 4/1997 |

OTHER PUBLICATIONS

Original and Translation of CN 116238467 A; Sheng Zhijie, Wang Meng, Sheng Lei, Miao Aiping, Ma Tengfei; Jun. 9, 2023.*
International Search Report for PCT/EP2022/085565, dated Mar. 8, 2023, 8 pages.

* cited by examiner

*Primary Examiner* — Paul J Gray
(74) *Attorney, Agent, or Firm* — Lippes Mathias LLP

(57) ABSTRACT

A brake valve has a main body, a shaft movable within the main body, a spool plate, a first spring and a second spring arranged within the main body. The spool plate is movable between a release configuration and a brake configuration where the shaft is adapted to be linked with a first actuator configured to slide the shaft. The brake valve has a command fluid port connected to a brake chamber. A valve ring defines the brake chamber with the main body and the shaft. The valve ring is configured to, when a pilot pressure is applied in the brake chamber, move the shaft towards the actuated position or push the second spring so as to move the spool plate towards the brake configuration.

12 Claims, 9 Drawing Sheets

Z-Z

BRAKE VALVE WITH DUAL PILOTING

BACKGROUND OF THE DISCLOSURE

The invention relates to the field of vehicle braking systems, notably to the field of power brake valves.

STATE OF THE ART

Power brake valves are usually activated either directly by a command such as a brake pedal, or through a dedicated hydraulic circuit. Such a dual control of the brake is required to enable a direct user control, and a system control of the brake such as an electrically controlled braking system.

It is known to implement both braking systems on a vehicle, engine or equipment. However, the integration of a dual braking system is often problematic in terms of weight and volume, as the multiplication of the controls leads to a multiplication of the components required.

The present invention aims at providing at least a partial solution to these issues.

SUMMARY OF THE DISCLOSURE

The present invention relates to a brake valve comprising a main body, a shaft, a spool plate, a first spring and a second spring arranged within the main body,
   wherein the spool plate is movable between a release configuration and a brake configuration
   wherein the shaft comprises
      a proximal portion and
      a distal portion which is connected to a proximal end of the first spring, the first spring presents a distal end which abuts on the main body,
   the second spring presents a distal end which is adapted to act on the spool plate,
   wherein the shaft is movable within the main body along a longitudinal direction, between a retracted position and an actuated position,
   wherein
   in the actuated position, the spool plate is pushed into the brake configuration, and
   in the retracted position, the spool plate is in the release configuration, characterized in that
   the proximal portion of the shaft is adapted to be linked with a first actuator configured to selectively slide the shaft,
   the brake valve comprises a command fluid port connected to a brake chamber,
   a valve ring within the main body; which defines the brake chamber with the main body and the shaft, said valve ring being configured to, when a pilot pressure is applied in the brake chamber, push the shaft towards the actuated position or push the second spring so as to push the spool plate towards the brake configuration. The valve ring can be independent from the shaft, or can be solidly connected to the shaft or made integral with the shaft.

According to the claimed structure, the brake valve enables to actuate a brake either by the first actuator or by the valve ring actuated by the pressure coming from the remote piloting duct, wherein these two elements both act on an element, which can for instance be the shaft or the second spring. The second spring is for instance a charging return mean that sets a retroaction in the brake valve.

According to an embodiment the shaft can be pushed towards the actuated position by the first actuator and/or by the pressure applied in the brake chamber. In this particular case the distal portion of the shaft is connected to a proximal end of the second spring.

According to an example, the first spring and the second spring are arranged concentrically.

According to an example, the second spring is arranged in an inner volume defined by the first spring.

According to an example, the distal portion of the shaft is connected to a proximal end of the second spring, the shaft comprises an abutment on an outer surface of the shaft, and wherein the valve ring is adapted to abut against said abutment to push the shaft towards the actuated position when the pilot pressure is applied in the brake chamber.

According to an example, the brake valve further comprises a tappet arranged within the main body, wherein the tappet is located between the spool plate and the shaft, and the distal end of the second spring is connected to the tappet so as to press the tappet on the spool plate.

According to an example, the first spring is configured to urge the shaft towards its retracted position.

According to an example, the second spring has a stiffness which is higher than a stiffness of the first spring.

According to an example, sealing elements are provided between the shaft and the main body. Those sealing elements can for example have a toroidal shape. According to an example, two of such sealing elements are arranged in the proximal end of the main body separated from each other by a set distance. For example, this set distance is larger than the stroke of the shaft in the main body.

The shaft can comprise an optional inner channel that has a first opening emerging between said two sealing elements, and a second opening emerging in the casing of the brake valve. Particularly this second opening is emerging in the inner volume of the main body, in a room where the first spring and second spring are located. This inner volume can be in fluidic connection with the tank through a drain line so that any compression of this inner volume doesn't generate an excessive pressure rise. This inner channel can for instance enable to ensure that any oil leakage from the brake chamber toward the proximal end of the main body is collected to be sent back to the inner volume of the main body of the brake valve rather than getting out of the brake valve.

The present invention also relates to a brake assembly comprising the brake valve as defined previously, a brake actuator linked to the proximal portion of the shaft, a pressure switch adapted to pilot the pressure delivered to a brake circuit; wherein the brake valve is configured so as to activate the pressure switch when the spool plate is in the brake configuration.

According to an example, the pressure switch is configured to allows providing a pressurization of a pressure braking line which is proportional to a displacement of the shaft.

According to an example, the maximum pressure which can be transmitted by the pressure switch to a brake line is based notably on the characteristics of the second spring.

According to an example embodiment, the maximum pressure which can be transmitted by the pressure switch to a brake line is not necessarily equal to the pressure of the pressure source but can be a pressure value between the atmospheric pressure and the level of pressure of the associated pressure source.

The brake pressure provided by the pressure valve is defined based on the pressure of an associated pressure source and tank pressure, i.e. ambient pressure. The brake pressure applied is defined by an equilibrium between the action of a return spring and a and a feedback from the pressure of the brake line on the switch on one side, and the command applied on the pressure valve on the other side.

According to an example, the brake assembly comprises two pressure switches adapted to be activated by the brake valve when the tappet is in the brake configuration.

According to an example, said two pressure switches define a dual-circuit braking assembly adapted to provide two output pressures for two independent braking circuits. In this example a single command fluid port thus allows to remotely activate two independent braking circuits.

According to an example, the brake assembly comprising a pilot circuit adapted to selectively provide a pilot pressure to the command fluid port.

According to an example, the brake actuator is a brake pedal.

According to an example, the command fluid port is connected to a pressure source, and said pressure source can for instance be a hydraulic pump, a master cylinder, a hydraulic accumulator, or any other means allowing to generate a fluid pressure.

BRIEF DESCRIPTION OF THE DRAWINGS

The invention and its advantages will be better understood upon reading the detailed description made hereafter of different embodiments of the invention, given by way of non-limiting examples. This description makes reference to the pages of appended drawings, in which.

In all the figures, similar elements are designated by identical numerical references.

DETAILED DESCRIPTION

Figure 1:
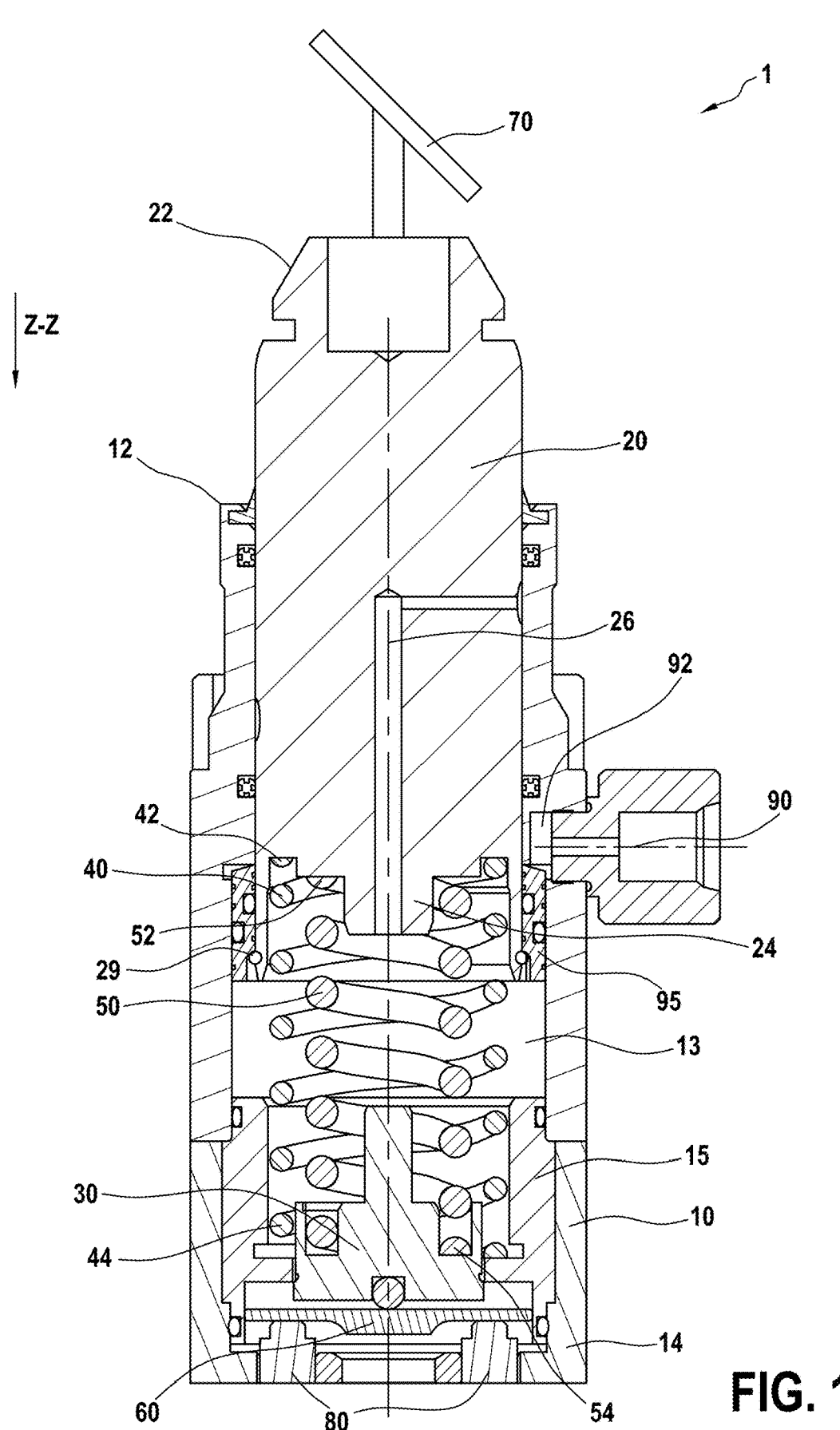
FIG. 1 is a partial view of a brake valve according to an aspect of the invention.
Figure 2:
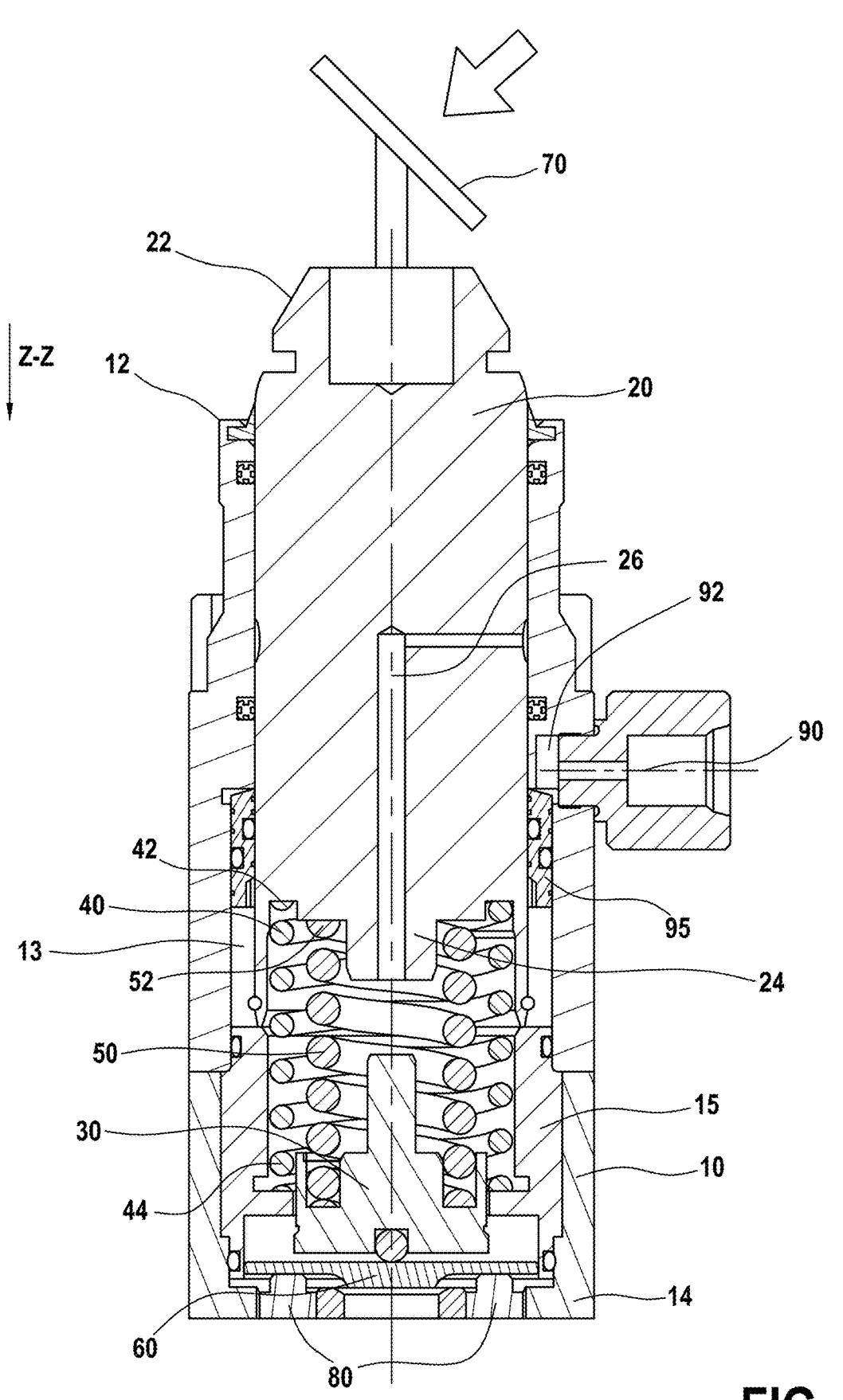
FIG. 2 is another partial view of a configuration of a brake valve according to an aspect of the invention.
Figure 3:
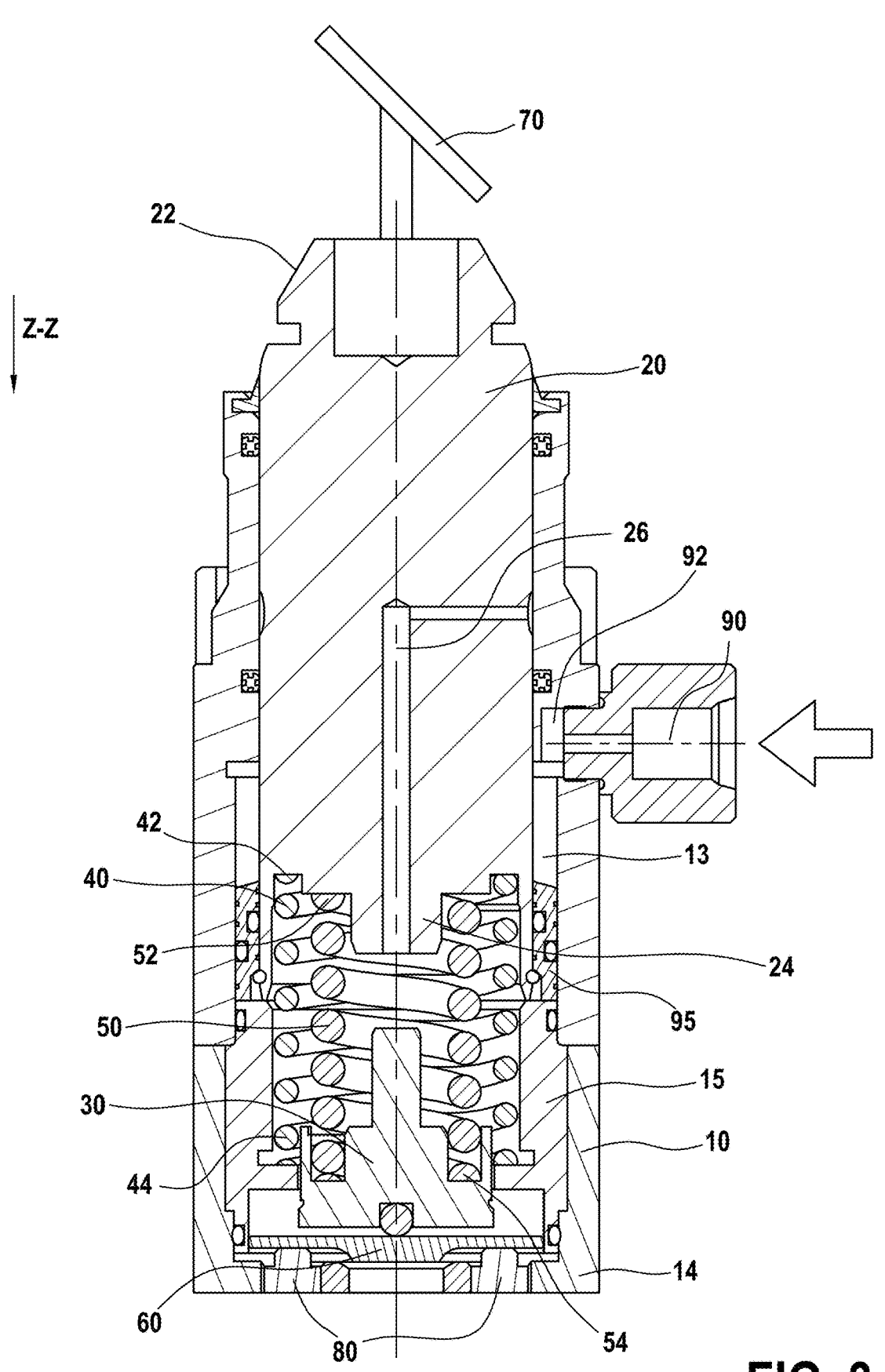
FIG. 3 is another partial view of a configuration of a brake valve according to an aspect of the invention.
Figure 4:
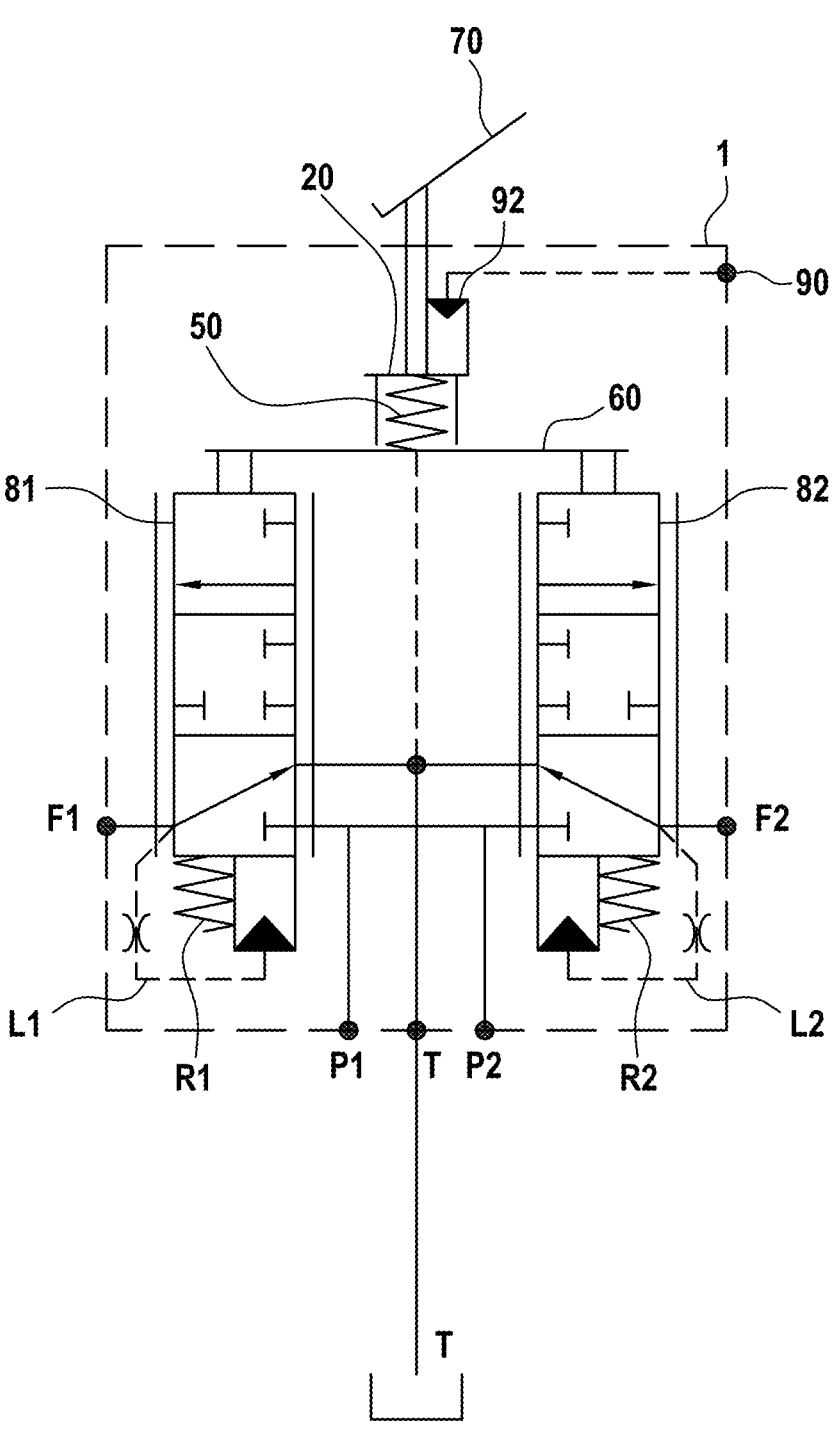
FIG. 4 is a schematic representation that illustrates the operation of the brake valve.
Figure 5:
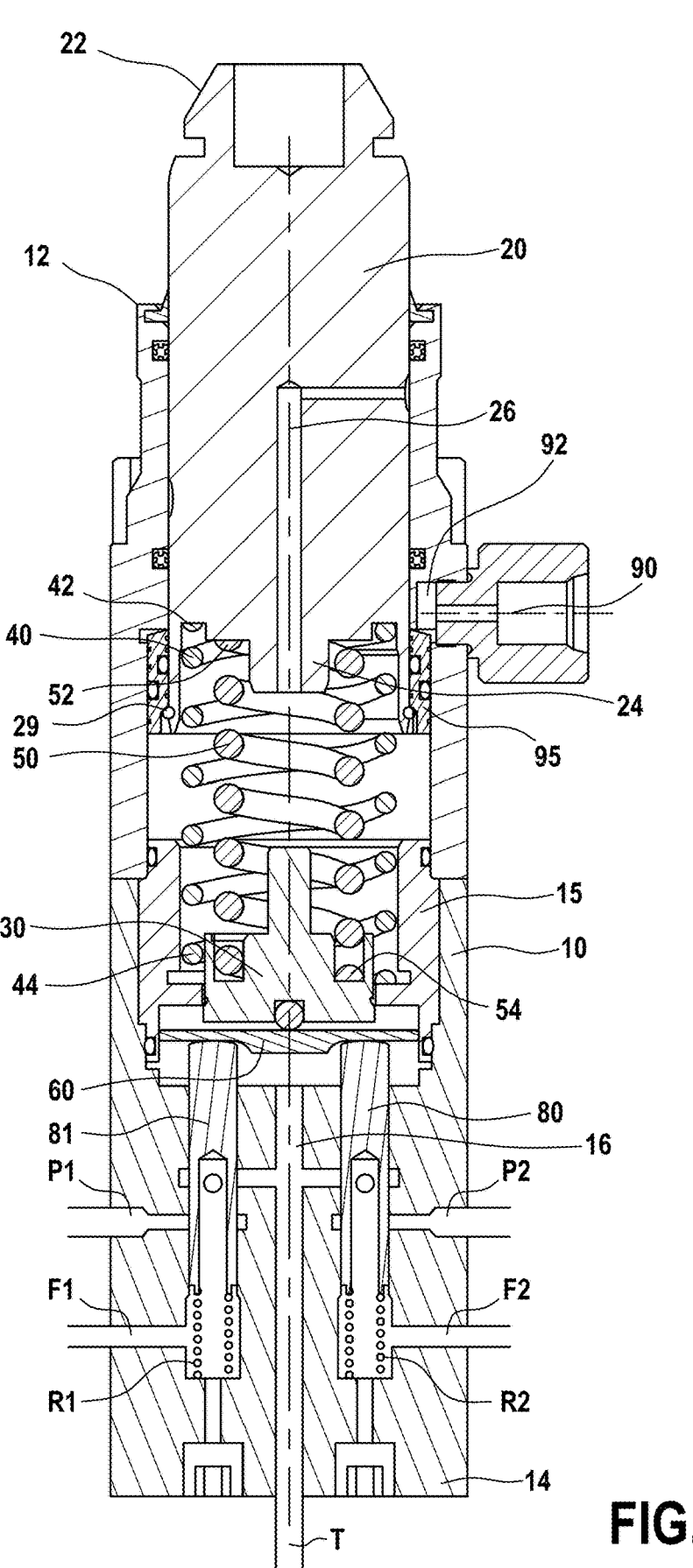
FIG. 5 is an example of a brake valve according to an aspect of the invention.

The figures present an example embodiment of a brake valve 1 according to an aspect of the invention in different configurations. FIGS. 1-3 present a partial view of the brake valve, FIG. 4 illustrates the actuation of the brake valve 1, and FIG. 5 presents an example of the entire structure of the brake valve 1.

The brake valve 1 as depicted comprises a main body 10, a shaft 20, a tappet 30, a first spring 40, a second spring 50 and a spool plate 60.

The main body 10 as represented extends along a longitudinal direction Z-Z. It has a cylindrical general shape, with an inner volume.

The shaft 20 is arranged to be at least partially within the main body 10, and is arranged to be able to slide within the main body 10 along the longitudinal direction Z-Z. In the illustrated example, the shaft 20 is inserted through a proximal end 12 of the main body 10, the main body comprising also a distal end 14, opposed to the proximal end 12 along the longitudinal direction Z-Z. The shaft 20 can move between a retracted position and an actuated position which will be detailed hereafter.

For ease of description, we define for the shaft 20 a proximal portion 22 and a distal portion 24. The proximal portion 22 is arbitrarily defined as the portion of the shaft 20 which protrudes from the main body 10, while the distal portion 24 is arranged within the main body 10. We understand however that this designation is not limiting, and that the proximal portion 22 can also be arranged within the main body 10.

Sealing elements are provided between the shaft 20 and the main body 10. In the illustrated embodiment, the shaft 20 comprises an optional inner channel 26 which ensures a proper lubrication of a volume between the shaft 20 and the main body 10 and located between two seals.

Particularly, the inner channel 26 can for instance enable to ensure that any oil leakage from the chamber 92 toward the proximal end 12 of the main body 10 is collected and sent back in the casing of the brake valve rather than getting out of the brake valve 1.

In the illustrated embodiment, the inner channel 26 presents a first end which emerges in the inner volume 13 of the main body 10 and a second end which emerges laterally between the shaft 20 and the main body 10 and longitudinally between the two seals that are arranged in the proximal end 12 of the main body 10.

The two seals are typically separated from each other by a distance along the longitudinal direction which is greater than the stroke of the shaft 20.

With such an assembly, any oil that would potentially escape from the brake chamber 92 and go beyond a first sealing element (which is the one closer to the distal end 14 of the main body 10), would be collected by the channel 26 to go to the casing of the brake valve rather than going beyond a second sealing elements (which is the one closer to the proximal end 12 of the main body 10).

The inner volume 13 of the main body 10 is in fluidic connection with the tank T through clearances between the tappet 30, the spool plate 60 and the abutment 15 then through a duct line 16 (only visible in FIG. 5) and through a drain line D, so that a reduction of this inner volume 13 doesn't generate an excessive pressure rise in this inner volume. This enables to prevent a leakage of oil out of the brake valve 1. It is to be noted that this channel 26 is optional and the same embodiment can work very fine without such a channel 26.

The proximal portion 22 is associated with a first actuator 70, such as a pedal, which can be actuated for instance by a user, directly or indirectly, to control the translation of the shaft 20 as it will be further detailed hereafter.

The distal end 14 of the main body 10 is provided with the spool plate 60, which is movable along the longitudinal direction between a release configuration and a brake configuration.

The spool plate 60 is arranged to act on one or more pressure switches 80 that are configured to pilot a brake. In the illustrated embodiment, two pressure switches 80 are represented. We understand however that this is not limiting, and that the invention applies to one or more pressure switches. In the brake configuration, the spool plate 60 is pressed against the pressure switches 80 so as to apply a brake command on the pressure switches. In the release configuration, the spool plate 60 is retracted within the main body 10, and does not press the pressure switches 80 so that no brake command is applied on the pressure switches 80. In the representations of FIGS. 1 to 3, the distal end 14 of the main body 10 is typically provided with a cover that comprises openings for the pressure switches 80 and that is configured to allow a proper displacement of the spool plate 60. As we will see in FIG. 5, the lower portion of the main body 10 can be configured to accommodate the pressure switches 80 and allow a proper displacement of the spool plate 60.

The tappet 30 is provided within the main body 10. It is configured to move along the longitudinal direction Z-Z, and to be in contact with the spool plate 60, for instance through a seal or damping element.

The distal portion 24 of the shaft 20 is connected to a proximal end 42 of the first spring 40 and can also be connected to a proximal end 52 of the second spring 50. These proximal ends of the first and second spring 40 and 50 can be either fixed or arranged to abut on the distal portion 24 of the shaft 20, or arranged within a housing provided at the distal portion 24 of the shaft 20.

A distal end 44 of the first spring 40 is configured to be connected or to abut on the main body 10, and is therefore in a fixed position. The first spring 40 therefore acts as a compression spring which opposes to the translation of the shaft 20 within the main body 10.

In the illustrated embodiment, the first spring 40 is arranged around the second spring 50. In other words, the second spring 50 is arranged within an inner volume defined by the first spring 40. The first spring 40 and the second spring 50 are typically arranged concentrically, and are typically centered on the longitudinal axis Z-Z.

A distal end 54 of the second spring 50 is connected to the tappet 30. By connected, it is understood here that the distal end 54 of the second spring 50 is in contact with the tappet 30. It can be fixed or not to the tappet 30, or for instance maintained in position in a dedicated housing of the tappet 30.

The first spring 40 and the second spring 50 can be replaced by elastic return means of an appropriate shape and type.

The second spring 50 typically has a stiffness which is higher than the stiffness of the first spring 40.

The main body 10 is also provided with a command fluid port 90, adapted to be connected to a supply line for a command fluid. The command fluid port 90 is for instance connected to a pilot circuit, configured to selectively provide a pilot pressure to the command fluid port 90. The brake valve 10 comprises a valve ring 95 which is provided within the main body 10, around the distal portion 24 of the shaft 20.

The valve ring 95 defines a brake chamber 92 with the shaft 20 and the main body 10. This brake chamber 95 is connected to the command fluid port 90, and can therefore be supplied with fluid so as to control the pressure within the brake chamber 92. The valve ring 95 can slide along the shaft 20, along the longitudinal direction Z-Z. Its displacement along the longitudinal direction is limited on one side by the main body 10, and on the other side by an abutment 29 arranged on the distal portion 24 of the shaft 20. The rise in pressure in the brake chamber 92 tends to move the valve ring 95 towards the distal portion 24 of the shaft 20, until it comes into contact with the abutment 29. The movement of the valve ring 95 will then move the shaft towards the distal end 14 of the main body 10. In the illustrated embodiment, the abutment 29 is formed by a ring arranged on the distal portion 24 of the shaft 20. We understand that this is not limiting, and that the abutment 29 can be formed by any means that limit the displacement of the valve ring 95 relative to the shaft 20, for instance by a shape of the distal portion 24 of the shaft 20, or by an element arranged around the shaft 20.

The brake chamber 92 is configured so that an increase in pressure in said brake chamber 92 tends to push the shaft 20 within the main body 10, from the proximal end 12 towards the distal end 14 of the main body 10.

In an alternative embodiment, the valve ring 95 can act directly or through an intermediate component on the second spring 50. The valve ring 95 is therefore arranged so that an increase of pressure within the brake chamber 92 will move the second spring 50 so as to move the spool plate 60 towards the brake configuration. In such an embodiment, the second spring 50 and the first spring 40 are for instance arranged side by side, or can be arranged concentrically, for instance with the spring 40 being arranged within the second spring 50.

In a further alternate embodiment, the valve ring 95 can be solidly connected to the shaft 20 or made integral with the shaft 20. The valve ring 95 therefore moves together with the shaft 20.

We then describe the use of the brake valve 1.

As mentioned, the brake valve 1 is associated with a first actuator 70 such as a brake pedal, or more generally what can be considered as a direct actuator adapted to directly apply a command issued by a user, and comprises a command fluid port 90 adapted to be connected to a supply line for a command fluid. These two elements provide two ways to control the brake valve 1 as proposed. We understand here that these two elements provide a direct control and an indirect control on the brake valve 1. By indirect control, it is referred for instance to a remote control piloted by an electronic control unit of any appropriate type of controller or device, by contrast with a direct control which results directly from the action of a user. We understand that the direct control can act directly on the brake valve, or through transmission elements or mechanisms. The remote control is piloted by a control unit, and delivers a signal that can result for instance from the use of a static brake pedal or command, from the use of a valve and a source of dynamic pressure, or that can be piloted by an electronic control unit that enables to pilot a valve associated to a source of dynamic pressure.

We consider an initial configuration in which no brake command is applied. This corresponds to FIG. 1. In this initial configuration, the shaft 20 is in a retracted position; it is urged towards the proximal end 12 of the main body 10 by the first spring 40.

In a first configuration that is represented in FIG. 2, a user applies a brake command through the first actuator 70, for instance by pressing a brake pedal. In a more general way, the first actuator 70 is an actuator that can be activated directly by the user, by opposition with a remotely controlled actuator. This will push the shaft 20 and displace it within the main body 10 along the longitudinal direction Z-Z, towards the distal end 14 of the main body 10. The first spring 40 will oppose to this displacement, and will be compressed. The second spring 50 will then push the tappet 30, which will in turn push the spool plate 60 in the brake configuration on the pressure switches 80. This pressure applied on the pressure switches 80 will enable to pilot a brake pressure for a circuit. The pressure switches 80 will then issue a brake command that will for instance be proportional to the displacement of the shaft 20 or proportional to the displacement of the proximal end 52 of the second spring 50. The maximum pressure that can be transmitted by the pressure switches 80 will depend notably on the characteristics of the second spring 50. The braking valve 1 can comprise one or more pressure switches 80 that can for instance provide one or more output pressures for one or more independent braking circuits. For instance, the braking valve 1 can comprise two pressure switches 80 that can pilot two output pressures for two independent braking circuits.

In the configuration presented in FIG. 2, the shaft 20 has been moved until its distal portion 24 comes into contact with an abutment 15 formed by the main body 10. In this embodiment, the abutment 15 is an annular element arranged within the main body 10, and close to the distal end 14 of the main body 10. This position of the shaft 20 which corresponds to its maximum displacement towards the distal end 14 of the main body 10, and therefore to its maximum displacement towards the spool plate 60, will be referred to as the actuated position of the shaft 20. The abutment 15 can be formed either directly by the main body 10, or be a component arranged within the main body 10 as in the illustrated embodiment.

In the illustrated embodiment, the spool plate 60 is arranged within the component that defines the abutment 15. In addition, in the illustrated embodiment, the distal end 44 of the first spring 40 is connected to the component that defines the abutment 15. We understand here that the abutment 15 is considered as a part of the main body 10.

In the example illustrated in FIG. 2, no pilot pressure is applied through the command fluid port 90. The valve ring 95 therefore remains in its initial position.

In a second configuration that is represented in FIG. 3, the first actuator 70 is released (in order words, no command is applied through the first actuator 70), but a pilot pressure is applied through the command fluid port 90. The increase of pressure in the brake chamber 92 will tend to push the valve ring 95 towards the distal end 14 of the main body 10. As mentioned previously, the valve ring 95 will therefore come into contact with the abutment 29 arranged in the distal portion 24 of the shaft 20, and the pressure increase within the brake chamber 92 will therefore lead to a displacement of the shaft 20 until it reaches the actuated position.

We can therefore understand that the displacement of the shaft 20 can be controlled by the application of a command by the first actuator 70, or by the application of a pilot pressure through the command fluid port 90. These two elements are presented independently, but can be combined. The action of the first actuator 70 and of the pilot pressure applied through the command fluid port 90 will then be additive, so as to amplify the efforts applied on the shaft 20 to push it towards its actuated position. The claimed brake valve 1 therefore provides a double piloting function, and can be piloted either by a user or by a control unit, which enables to achieve an improved security function.

The displacement of the shaft 20 will in turn cause the compression of the second spring 50. This will then increase the pressure applied on the spool plate 60 via the tappet 30, to move the spool plate 60 in its brake configuration, and will then increase the pressure applied on the pressure switches 80, so as to obtain a braking effect.

Upon release of the command applied through the first actuator 70 and/or the command fluid port 90, the shaft 20 is urged towards its retracted position by the first spring, which will reduce the pressure applied in the pressure switches 80 by the spool plate 60 and therefore reduce the braking effect, until the spool plate 60 reaches its release configuration.

The brake valve 1 as proposed can therefore be controlled through 2 different sources; a first actuator 70 which can be for instance a brake pedal, a lever, or any adapted actuator, and a pilot pressure which is provided through the command fluid port 90.

The brake valve 1 according to the present invention therefore combines a direct operation through the first actuator 70, for instance through a brake pedal, and a remote operation through the application of the pilot pressure, which is advantageous in terms of volume and weight over the known device.

In addition, in the brake valve 1 as presented by the invention, the two brake commands are cumulative, which enables to amplify the brake command issued by a user. The pilot pressure that is applied through the command fluid port 90 can therefore act as an amplifier.

FIG. 4 illustrates the operation of the brake valve 1 and details more specifically the operation of the pressure switches 80 of the brake valve 1. FIG. 5 illustrates the corresponding structure of the brake valve 1. While the operation is described with respect to a direct operation by an actuator such as a brake pedal, we understand that the following also applies with a piloting through a remote actuator through the application of the pilot pressure as described previously.

The brake valve 1 as represented comprises two pressure switches 81 and 82 that are progressive valves. Each pressure switch 81 and 82 is connected to a tank T, to a pressure source through a pressure line P1 and P2 respectively, and to a brake line F1 and F2 respectively. The structure of the brake valve here is simplified; the first spring 40 is not represented, and the spool plate 60 is represented as a single component with the tappet 30.

The brake valve 1 can evolve between a rest position (where the pressure switches 80 are in their release configuration, i.e. retracted within the main body 10), which connects the two brake lines F1, F2 to the tank, and a maximum braking position, which allows a maximum pressurization of the two brake lines F1, F2 over a course of activation of the first actuator 70, such as the brake pedal as illustrated.

The pressurization applied to the brake lines F1 and F2 can be proportional to the displacement of the shaft 20.

Return means R1, R2 hold respectively the two pressure switches 81 and 82 in the rest position by default, which is in the absence of the application of a command issued through the first actuator 70 or through a pilot pressure.

The maximum pressure which can be transmitted by the two pressure switches 81 and 82 to the brake lines F1, F2 does not depend on (or at least is not equal to) the pressure level of the associated pressure source connected to the pressure lines P1 and P2, but is based, for instance essentially, on the characteristics of the second spring 50. Such a brake valve 1 allows a good operability and greater flexibility in the use of the pressure sources.

The two valves that form the two pressure switches 81 and 82 form two subunits of the same physical brake valve 1 as defined previously.

Each pressure switches 81 and 82 comprise a line L1, L2 respectively in order to apply a feedback of the pressure in the brake lines F1, F2 respectively.

We then describe the operation of the brake valve and the feedback applied to the pressure switches 81 and 82.

In the rest position: there is no top-down thrust applied on the spool plate 60 coming from the first actuator 70 or from a remote actuator 90, the return means R1 and R2 tend to maintain the pressure switches 81 and 82 respectively in their upper position, which is their rest position or release configuration. In this configuration the brake lines F1, F2 are in hydraulic communication with the tank T, the brake lines F1 and F2 are therefore at atmospheric pressure (tank pressure). No pressure is applied to the brakes, and the brakes (for instance the brake 7 illustrated in FIGS. 6 and 7 described hereafter) are released.

In the maximum braking position: A top-down thrust comes from the first actuator 70 or from a remote actuator 90 and is transmitted to the second spring 50 that pushes the spool plate 60 downward. The pressure switches 81 and 82 are pushed down, establishing a hydraulic communication between the pressure lines P1, P2 and the brake lines F1, F2 respectively. The pressure in the brake lines F1, F2 will then increase so as to apply a braking pressure, which will then activate the brakes in case of positive pressure brakes.

However as feedback lines L1, L2 are in pressure communication with the brake lines F1, F2 respectively, an increase of pressure in the bottom of the pressure switches 81 and 82, will generate an antagonistic thrust in the bottom of the valves allowing an upward movement of the pressure switches 81 and 82. The upward movement of the pressure switches 81 and 82 will reduce the hydraulic communication between the pressure lines P1 and P2 and the brake lines F1 and F2, therefore limiting the pressure establishment in the brake lines F1 and F2. The balance between this feedback pressure applied through the feedback lines L1 and L2 and the brake command applied to the brake valve 1 will define an equilibrium position and then limit the output pressure in the brake lines F1 and F2 to a maximum level of pressure that is lower than the values of the pressure in the pressure lines P1 and P2. This maximum level of pressure depends on the calibration and the design of the different springs of the valve 1, notably the first spring 40, the second spring 50, and the return means R1 and R2.

Between the rest position and the maximum braking position: the equilibrium will be established on the same principle, providing an intermediate value between the ambient pressure and the maximum reachable level of output pressure. The output pressure in the brake lines F1, F2 can be for example proportional to the displacement of the shaft 20 or proportional to the displacement of the proximal end 52 of the second spring 50.

The command fluid port 90 can be supplied by the same pressure source that is connected to the pressure lines P1 and P2.

Figure 6:
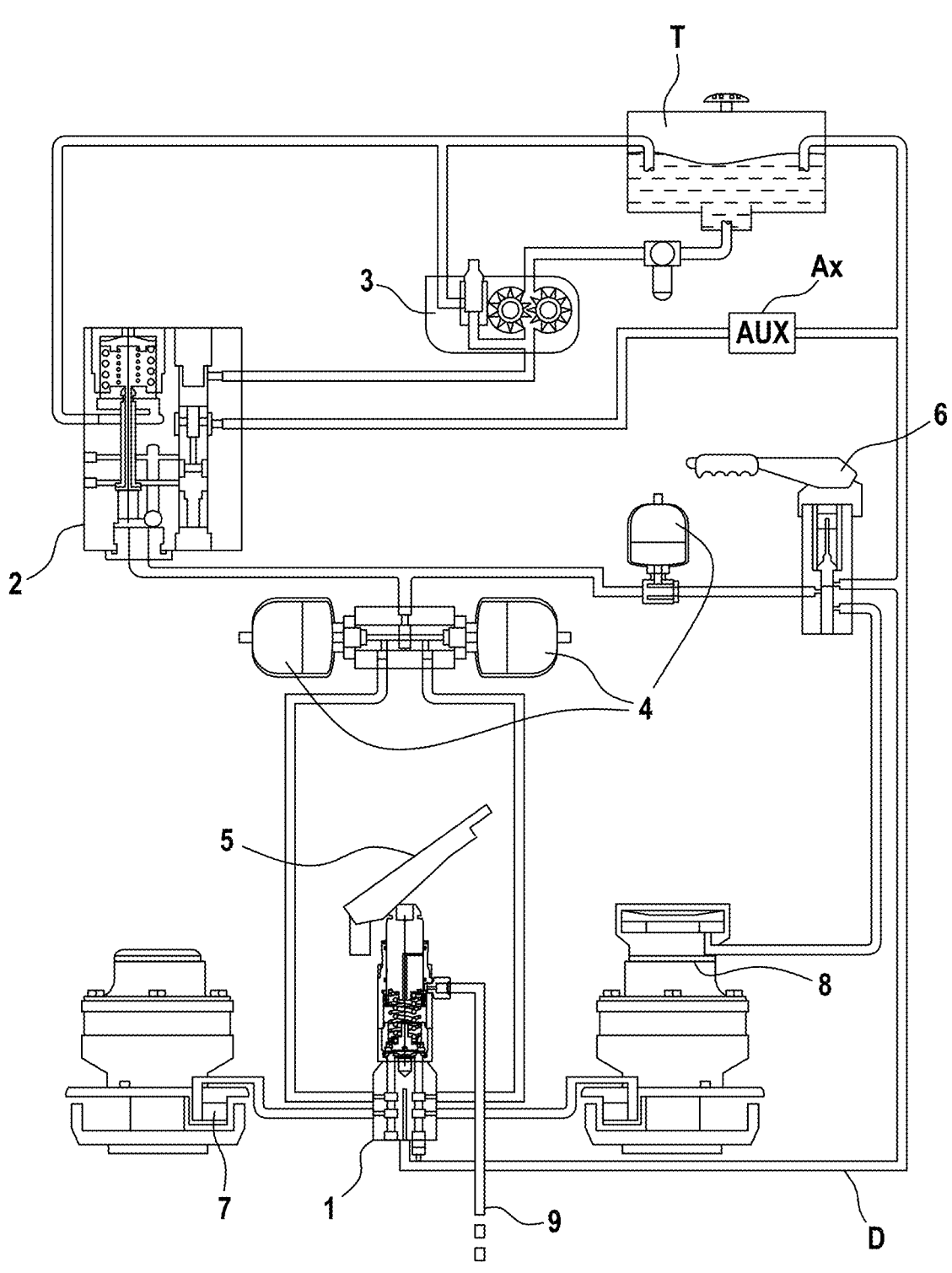
FIG. 6 is an example of hydraulic braking circuit that comprises a brake valve according to an aspect of the invention.

FIG. 6 presents an illustrative example of a hydraulic circuit comprising the brake valve 1 as defined previously.

The hydraulic circuit as illustrated comprises the brake valve 1, an oil tank T, a pump 3 connected to the tank T and designed to cause a flow of oil to feed the accumulator charging valve 2.

The accumulator charging valve 2 is configured to send excess flow to auxiliaries Ax, but its main function is to charge the accumulators 4 whenever the pressure within the accumulators is under a threshold.

The illustrated hydraulic braking circuit comprises a parking brake lever and valve 6 that is configured to activate by default a negative parking brake 8. The circuit comprises a dynamic braking pedal 5 and valve 1 configured to actuate dynamic brake receptors 7, for instance such as brake disks.

The valve 1 is connected at least to the tank T, to a pressure source 4 and to a braking line 9.

Those brake receptors 7 can for instance include a plurality of disks linked in rotation with the shaft of the motor (the rotor part) and another plurality of disks linked in rotation with the casing of the motor (stator part), the disks of both types are alternating with each other's forming a stack. The brake receptors 7 also include a piston that is movable inside a cylinder, such that the displacement of the piston induces the compression of the disks stack producing friction between the disks which slows the rotation of the disks, and then results in slowing the rotation of the motor.

Figure 7:
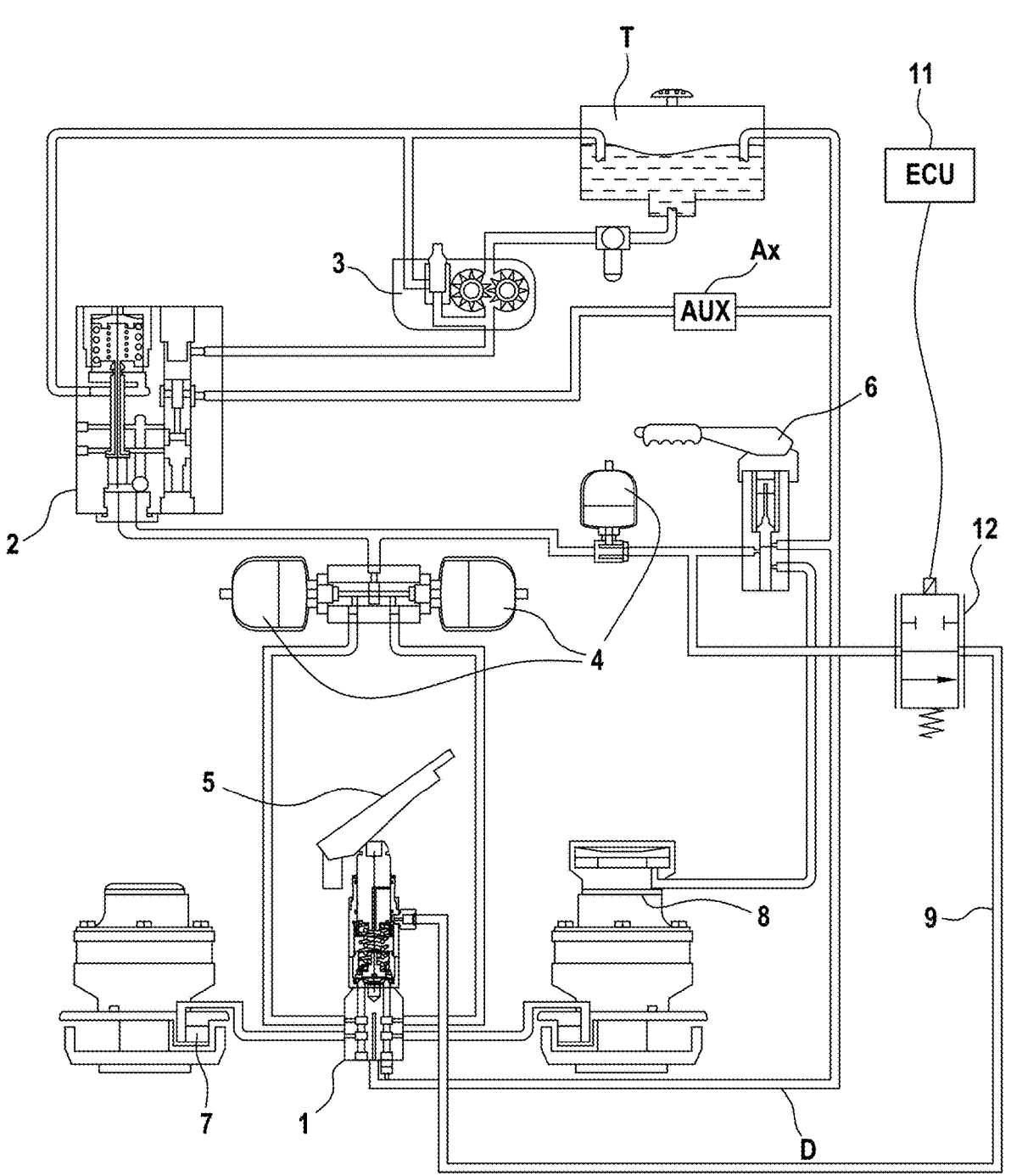
FIG. 7 is an example embodiment of the hydraulic braking circuit of FIG. 6.

FIG. 7 presents a particular embodiment of the hydraulic circuit where the brake valve 1 is connected to a remote piloting pressure duct 9 linked with a pressure source 4 through an activation valve 10. The activation valve 10 can for instance be an electrically actuated progressive valve which can allow the pressure in the piloting pressure duct 9 to rise in response to an electric signal coming directly or indirectly from a controller 11 such as a control unit.

The piloting pressure duct 9 is typically provided with a check valve adapted to allow a proper admission or discharge of pressure within or from the brake chamber 92 depending on the movement of the valve ring 95 and the variations of volume of the brake chamber 92, notably when no command pressure is applied through the command fluid port 90.

The activation valve 12 can for instance be a normally opened progressive valve, which is a valve configured so that the brake is activated by default (i.e. when no command is applied), which is interesting for safety reasons. In an alternative embodiment, the activation valve 10 can be a normally closed progressive valve to ensure by default the free rotation of the wheels of the vehicle or engine.

Figure 8:
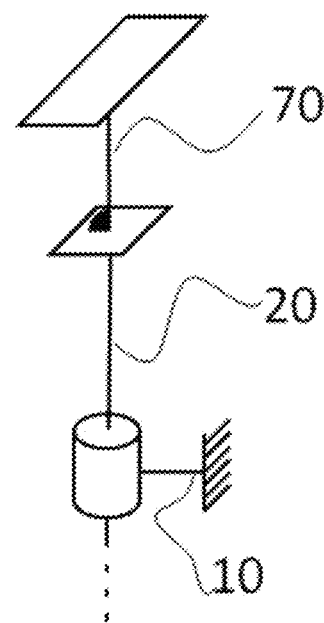
FIG. 8 is an example embodiment of the connection of an actuator of the brake valve.
Figure 9:
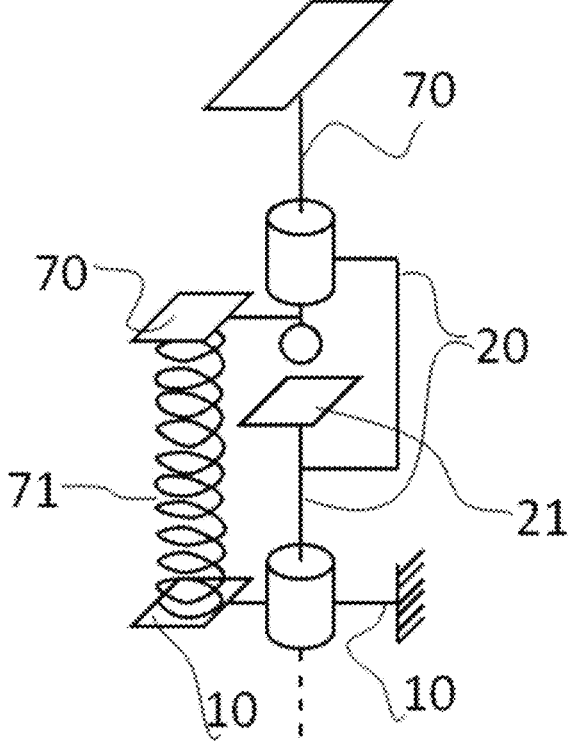
FIG. 9 is another example embodiment of the connection of an actuator of the brake valve.
Figure 10:
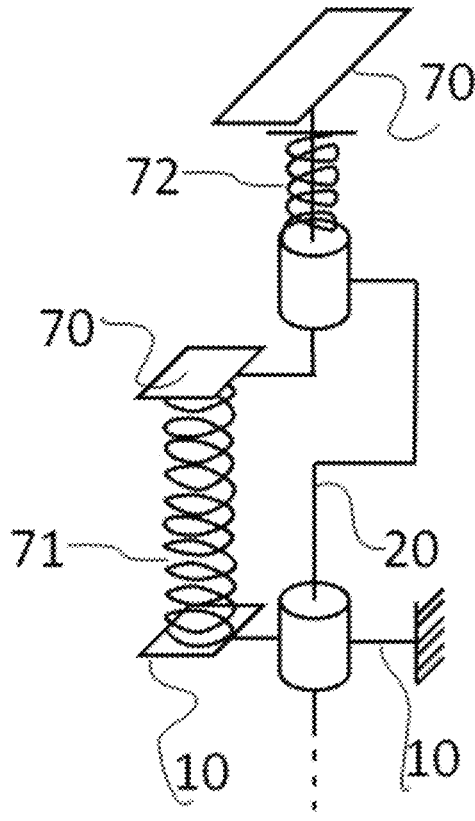
FIG. 10 is another example embodiment of the connection of an actuator of the brake valve.

The first actuator 70 can be connected to the shaft 20 in different ways that we describe hereafter with reference to FIGS. 8, 9 and 10, which are cinematic representations of the connection between the first actuator 70 and the shaft 20. In these figures, the main body 10 of the brake valve 1 is represented as the static frame or basis, and the other elements of the brake valve 1 are not represented.

In a first specific embodiment, the movements of the first actuator 70 are correlated with the vertical movements of the shaft 20, that is to say that when the shaft 20 is moved along the longitudinal direction, the first actuator 70 is also moved, and reciprocally. Therefore, when a remote command generates a thrust on the shaft 20 which moves the shaft 20 along the longitudinal direction (i.e. towards its activated position), the first actuator 70 is also moved, for instance moved down in case of a brake pedal, so that the user can feel or see that the braking is remotely piloted.

FIG. 8 illustrates such an embodiment. In this specific embodiment, the first actuator 70 is embedded in the shaft 20. We understand that this embodiment is not limiting, and is provided purely as an example. The connection between the first actuator 70 and the shaft 20 can for instance be made through gears, a crankshaft, a rack and pinion, a worm wheel, a screw nut system or any appropriate mechanism so as to correlate the translation of the shaft 20 with a movement such as a rotational movement or a translation of the first actuator 70. The person skilled in the art will understand that such a correlation of movements of the first actuator 70 and the shaft 20 can also be obtained through other mechanical connections between the first actuator 70 and the shaft 20 not described here.

In another embodiment, the movements of the first actuator 70 are partially decorrelated with the movements of the shaft 20. In other words, when a remote command imposes a displacement of the shaft 20, it does not necessarily generate lowering displacement of the first actuator 70.

FIG. 9 illustrates an example configuration for such an embodiment. In this specific example, the first actuator 70 is connected to the shaft 20 through a vertical sliding pivot, and an abutment 21 is provided to allow the first actuator 70 to lower the shaft 20 if the user decides to use the first actuator 70, for instance by pushing down a brake pedal.

However, if the brake is activated through the remote command (though the command fluid port), which will move the shaft towards its activated position (the shaft 20 will go down if we consider the orientation of FIG. 9) the first actuator 70 will not be moved as the first actuator 70 and the shaft are in a sliding arrangement. Return means 71 such as a spring are arranged between the main body 10 and the first actuator 70 so as to maintain the first actuator 70 in a default position.

In such a configuration, when the brake valve 1 is activated simultaneously by the first actuator 70 and by the command fluid port 90, the efforts generated do not add to each other, at least on a portion of the stroke of the first actuator 70 as the shaft 20 can move independently from the first actuator 70 on a portion of its stroke.

FIG. 10 is a schematic representation of another specific embodiment. In this configuration, the first actuator 70 is connected to the shaft 20 through a vertical sliding pivot associated with return means 72 such as a spring, and also to the main body 10 through return means 71 such as a spring.

In such case, when a braking command is applied simultaneously through first actuator 70 and trough the command fluid port 90 (which is a remote command), the efforts to activate the brake valve 1, which is to move the shaft along the longitudinal direction towards its activated position, are additive.

Although the present invention has been described with reference to specific exemplary embodiments, it is obvious that modifications and changes can be carried out on these examples with departing from the general scope of the invention as defined by the claims. In particular, individual features of the different embodiments illustrated/mentioned can be combined into additional embodiments. Consequently, the description and the drawings must be considered in an illustrative, rather than a restrictive sense.

It is also obvious that all the features described with reference to a method are transposable, alone or in combination, to a device, and conversely, all the features described with reference to a device are transposable, alone or in combination, to a method.

The invention claimed is:

1. A brake valve comprising a main body, a shaft, a spool plate, a first spring and a second spring arranged within the main body, wherein the spool plate is movable between a release configuration and a brake configuration wherein the shaft comprises a proximal portion and a distal portion which is connected to a proximal end of the first spring, the first spring presents a distal end which abuts on the main body, the second spring presents a distal end which is adapted to act on the spool plate, wherein the shaft is movable within the main body along a longitudinal direction, between a retracted position and an actuated position, wherein in the actuated position, the spool plate is pushed into the brake configuration, and in the retracted position, the spool plate is in the release configuration, wherein the proximal portion of the shaft is adapted to be linked with a first actuator configured to selectively slide the shaft, wherein the brake valve comprises a command fluid port connected to a brake chamber and a valve ring within the main body; which defines the brake chamber with the main body and the shaft, said valve ring being configured to, when a pilot pressure is applied in the brake chamber, push the shaft towards the actuated position or push the second spring so as to move the spool plate towards the brake configuration, wherein the distal portion of the shaft is connected to a proximal end of the second spring, the shaft comprises an abutment on an outer surface of the shaft, and wherein the valve ring is adapted to abut against said abutment to push the shaft towards the actuated position when the pilot pressure is applied in the brake chamber.

2. The brake valve of claim 1, wherein the first spring and the second spring are arranged concentrically.

3. The brake valve of claim 2, wherein the second spring is arranged in an inner volume defined by the first spring.

4. The brake valve of claim 1, which further comprises a tappet arranged within the main body, wherein the tappet is located between the spool plate and the shaft, and the distal end of the second spring is connected to the tappet so as to press the tappet on the spool plate.

5. The brake valve of claim 1, wherein the first spring is configured to urge the shaft towards its retracted position.

6. A brake assembly comprising the brake valve of claim 1, a brake actuator linked to the proximal portion of the shaft, a pressure switch adapted to pilot the pressure delivered to a brake circuit;

wherein the brake valve is configured so as to activate the pressure switch when the spool plate is in the brake configuration.

7. The brake assembly of claim 6, wherein the pressure switch is configured to allows providing a pressurization of a pressure braking line which is proportional to a displacement of the shaft.

8. The brake assembly of claim 6, wherein the maximum pressure which can be transmitted by the pressure switch to a brake line is based on the characteristics of the second spring.

9. The brake assembly of claim 6, which comprises two pressure switches adapted to be activated by the brake valve when the spool plate is in the brake configuration.

10. The brake assembly of claim 9, wherein said two pressure switches define a dual-circuit braking assembly adapted to provide two output pressures for two independent braking circuits.

11. The brake assembly of claim 6, further comprising a pilot circuit adapted to selectively provide a pilot pressure to the command fluid port.

12. The brake assembly according to claim 6, wherein the brake actuator is a brake pedal.

* * * * *